United States Patent
Ying et al.

(10) Patent No.: US 9,955,001 B2
(45) Date of Patent: *Apr. 24, 2018

(54) DEVICE LOCK WHILE IN MOTION

(71) Applicant: McAfee, LLC, Plano, TX (US)

(72) Inventors: John Ying, Los Altos, CA (US); Eming Saung, San Jose, CA (US); Yi Zheng, Cupertino, CA (US)

(73) Assignee: McAfee, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/511,303

(22) PCT Filed: Aug. 25, 2015

(86) PCT No.: PCT/US2015/046818
§ 371 (c)(1),
(2) Date: Mar. 15, 2017

(87) PCT Pub. No.: WO2016/048538
PCT Pub. Date: Mar. 31, 2016

(65) Prior Publication Data
US 2017/0289343 A1 Oct. 5, 2017

Related U.S. Application Data

(63) Continuation of application No. 14/494,086, filed on Sep. 23, 2014, now abandoned.

(51) Int. Cl.
*H04M 1/00* (2006.01)
*H04M 1/725* (2006.01)
*H04W 4/02* (2018.01)

(52) U.S. Cl.
CPC ... *H04M 1/72569* (2013.01); *H04M 1/72577* (2013.01); *H04W 4/027* (2013.01); *H04M 2250/10* (2013.01)

(58) Field of Classification Search
None
See application file for complete search history.

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

WO 2016048538 A1 3/2016

OTHER PUBLICATIONS

International Preliminary Report on Patentability in International Patent Application PCT/US2015/046818 dated Mar. 28, 2017.

(Continued)

*Primary Examiner* — Mohammed Rachedine
(74) *Attorney, Agent, or Firm* — Patent Capital Group

(57) ABSTRACT

In an example, a mobile device is configured to automatically lock when a detector, such as a GPS receiver, determines that the device is in motion above a certain speed threshold, such as 10 mph. Additional detectors may be used to determine whether the device is operated by the user or by a passenger, so that intelligent decisions can be made about whether to lock the device. During the lock, certain selected apps such as a GPS navigation system or music player may be enabled, with limited controls as appropriate. In some cases, hands-free operations may be available. The mobile device may also be configured to provide an automated response to incoming calls and messages.

25 Claims, 5 Drawing Sheets

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 8,036,715 B2 | 10/2011 | Buck et al. |
| 8,260,247 B2 | 9/2012 | Lazaridis et al. |
| 2008/0191546 A1 | 8/2008 | Plantamura et al. |
| 2010/0062788 A1 | 3/2010 | Nagorniak |
| 2010/0297930 A1* | 11/2010 | Harris .................. H04K 3/415 455/1 |
| 2011/0009107 A1* | 1/2011 | Guba .................... G08G 1/20 455/418 |
| 2011/0077032 A1 | 3/2011 | Correale et al. |
| 2012/0040665 A1* | 2/2012 | Liu ..................... H04W 4/008 455/426.1 |
| 2012/0244883 A1 | 9/2012 | Tibbitts et al. |
| 2012/0265977 A1 | 10/2012 | Ewell et al. |
| 2013/0029654 A1 | 1/2013 | Lesyna |
| 2013/0106603 A1* | 5/2013 | Weast ................... G06F 1/163 340/539.11 |
| 2013/0303106 A1 | 11/2013 | Martin |
| 2014/0045477 A1* | 2/2014 | Ewell, Jr. .............. H04W 4/027 455/418 |
| 2014/0107932 A1 | 4/2014 | Luna |
| 2014/0248864 A1* | 9/2014 | Rangarajan ........... H04W 4/001 455/418 |
| 2015/0050966 A1* | 2/2015 | West ................. H04M 1/72552 455/569.2 |
| 2016/0088146 A1 | 3/2016 | Ying et al. |

OTHER PUBLICATIONS

Final Office Action in U.S. Appl. No. 14/494,086 dated Apr. 28, 2016, 21 pages.
International Search Report and Written Opinion in International Application No. PCT/US2015/046818 dated Dec. 4, 2015, 10 pages.
Non-Final Office Action in U.S. Appl. No. 14/494,086 dated Sep. 10, 2015, 19 pages.

* cited by examiner

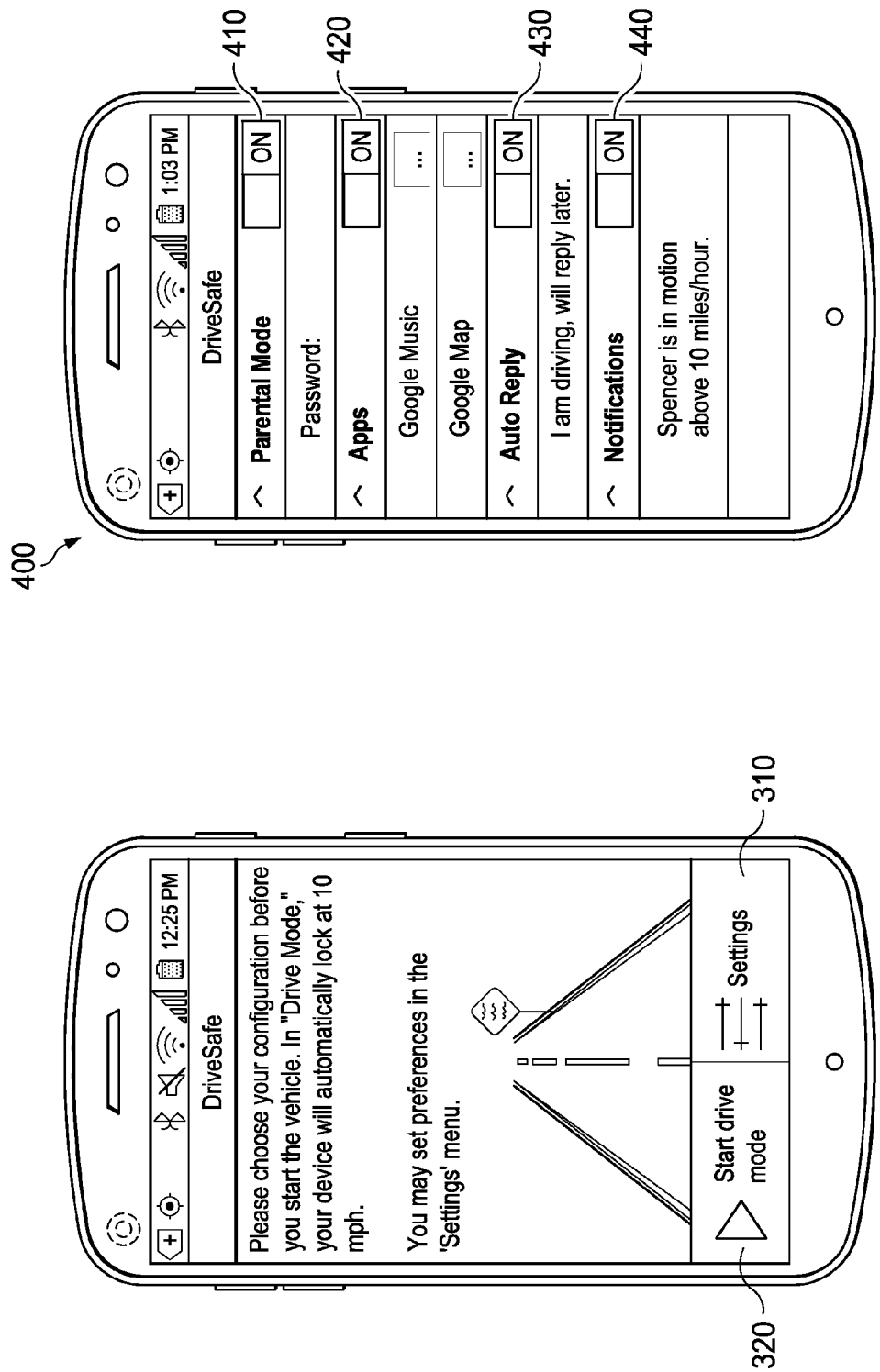

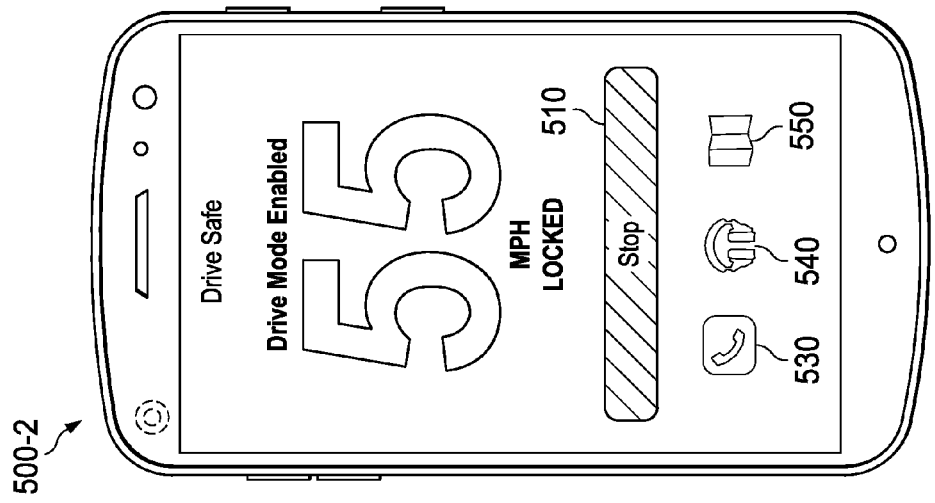

DEVICE LOCK WHILE IN MOTION

CROSS REFERENCE TO RELATED APPLICATION

This application is a national stage application under 35 U.S.C. § 371 of PCT International Application Serial No. PCT/US2015/046818, filed on Aug. 25, 2015 and entitled "Device Lock While in Motion", which Application claims priority to U.S. Utility application Ser. No. 14/494,086, titled "Device Lock While in Motion", filed 23 Sep. 2014, both of which are considered part of and are hereby incorporated herein by reference in their entirety in the disclosure of this application.

FIELD OF THE DISCLOSURE

This application relates to the field of computer-assisted public safety, and more particularly to automatic locking of a mobile device while in motion.

BACKGROUND

Abundant credible sociological data has shown that safety can be significantly decreased when a user operating a car is also talking on or otherwise using a cell phone or other mobile device. It is so broadly accepted as to be almost an axiom that safe handling of a motor vehicle requires the user to devote substantially his or her full attention to operating the vehicle.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 3 is a user interface according to one or more examples of the present Specification.

FIG. 4 is a user interface according to one or more examples of the present Specification.

FIG. 5 is a user interface according to one or more examples of the present Specification.

FIG. 6 is a user interface according to one or more examples of the present Specification.

DETAILED DESCRIPTION OF THE EMBODIMENTS

Overview

Figure 1:
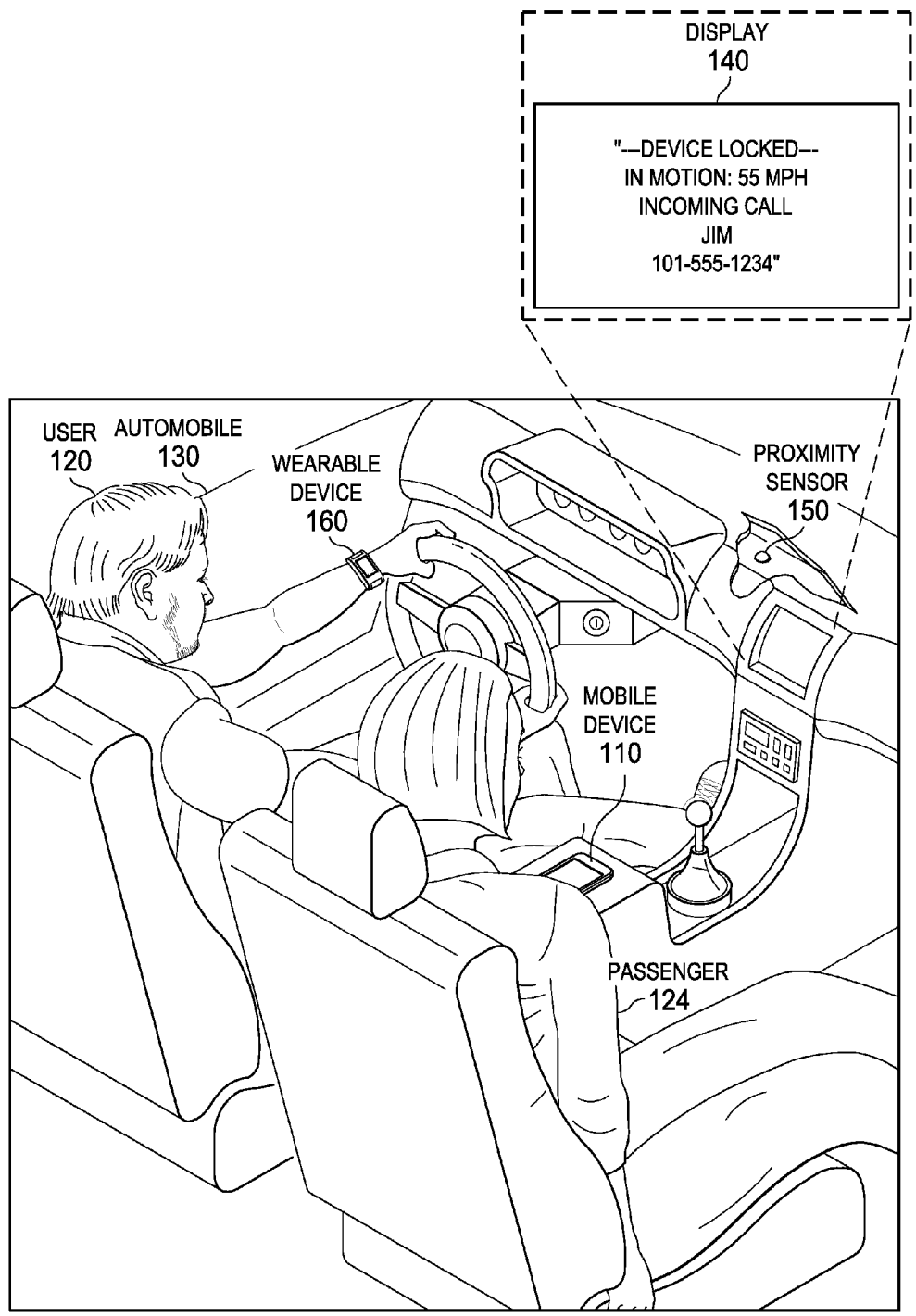
FIG. 1 is a perspective view of a user operating a mobile device according to one or more examples of the present Specification.

In an example, a mobile device is configured to automatically lock when a detector, such as a GPS receiver, determines that the device is in motion above a certain speed threshold, such as 10 mph. Additional detectors may also be used to determine whether the device is operated by the user or by a passenger, so that intelligent decisions can be made about whether to lock the device. During the lock, certain selected apps such as a GPS navigation system or music player may be enabled, with limited controls as appropriate. In some cases, hands-free operations may be available. The mobile device may also be configured to provide an automated response to incoming calls and messages.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

Contemporary news reports often feature stories of drivers who are injured or killed, or who injure or kill pedestrians or other drivers, when distracted by using a cell phone or other mobile device while also operating a motor vehicle. Many local governments have, in fact, passed laws restricting the use of cell phones while driving, including for example prohibiting texting while driving, requiring use of a hands-free device when talking on the phone while driving, prohibiting cell phone use in certain areas such as school zones, and even outright banning the use of cell phones while driving.

The Applicants of the present Specification therefore recognize that it is desirable to configure a mobile device so that operation of the device are selectively locked while the user is driving. For example, the device may be configured to automatically enter a locked state when it detects, such as through GPS or through an accelerometer or other speed detector, that it is in motion at a speed greater than a threshold such as 10 miles per hour (16.7 km/h). While the phone is in a locked state, user interfaces such as a touch screen may be locked out, thus preventing the user from performing useful work (or idle entertainment) while the vehicle is in motion. This enhances both individual and public safety.

While the phone is in the locked-out mode, certain features may be enabled to act as a proxy to actions the user may have taken. For example, if the user receives a text message, an automatic response may be sent, with an informative message such as "I am currently driving and unable to respond. I will get back to you when I can safely do so." Similarly, an automatic voice response may be played, with similar text, in response to voice call, which may then be directed straight to voice mail. In other examples, where it is considered safe and legal for the user to speak over a hands-free link, the user may be permitted to answer calls and speak over the hands-free link, but will otherwise be locked out from using telephone features.

In another case, the mobile device may be configured to permit limited interactions with certain selected applications. For example, in one case GPS navigation app may be enabled so that some navigation features of the mobile device are available. In another example, limited functionality of a music player may be enabled so that the user can listen to music, such as via an auxiliary audio connection or Bluetooth. These are examples of apps that can be usefully deployed with little to no distracting interactions from the user. The GPS navigation app, for example, may issue voice prompts for the user that do not require him to look at the device. The music app can be configured to play through a playlist with little or no further interaction from the user once the playlist is launched.

In certain examples, a limited set of voice commands may also be enabled, for example via a hands-free interface in the vehicle. In that case, the vehicle itself may provide a microphone, and may relay voice commands through a link such as a Bluetooth or wired link, that enable the user to perform limited control functions while driving. This may include the ability for the user to issue commands, including by way of non-limiting example, GPS commands ("Get directions to 123 Cedar Street"), music player commands ("Next track," "Previous track," "Shuffle," "Skip to 'Under Pressure' by David Bowie," "Open playlist 'Drive Time'"), commands for internet radio players ("Thumbs up," "Thumbs down," "Bookmark track," "Skip track," "Mark track three stars"), or other suitable voice commands that require limited attention from the user.

The limited available function set, either of the touch interface or voice interface, may be selected according to criteria including suitability for driving and minimal interaction required. On this two-axis spectrum, music apps and GPS navigation may score high on both axes, as they are tasks commonly associated with driving (users like to get directions and listen to music while driving), and require minimal user interaction. On the other hand, tasks like taking photographs, recording video, texting, and interacting with social media sites, may score low on both axes.

Driver safety can also be an important issue for enterprises that may be subject to tort liability if one of its employees negligently causes a traffic accident while, for example, operating a company-owned vehicle and using a company-issued mobile phone. In another context, it is desirable for a parent who is concerned about the safety of a minor operating a motor vehicle—who may be an inherently inexperienced driver, and also more lacking in judgment than an adult—to restrict the new driver's ability to operate a mobile device while driving.

According to one or more examples, the present Specification describes a system and method for locking out certain functions of a mobile computing device while a user is operating a motor vehicle. According to certain embodiments, the lockout function described herein may be a self-imposed restriction based on a policy that the user himself installs on a mobile device. In other embodiments, the restrictions may be based on enterprise mobile safety and security policies. In yet another example, the policy may be based on a family policy, wherein a parent imposes safety restrictions on a teenager or other new driver, or other person about whom the parent is concerned. In yet another context, the methods described herein may additionally be used for data security, for example to ensure that if a mobile device is stolen, a bad actor is denied access to enterprise data or other information.

In certain embodiments, a mobile device may operate in one of two modes: "normal" mode and "drive" mode. In normal mode, the mobile device simply operates according to its normal parameters. In drive mode, background software may monitor a suitable speed detector to determine whether the mobile device is traveling above a threshold speed. When traveling above the threshold speed, any or all of the lockout features described herein, or other suitable features, may be deployed.

In yet another embodiment, the mobile device may provide a "managed" or "unmanaged" mode. In unmanaged mode, the user may manually select either normal mode or drive mode at will. This gives the end user complete flexibility and control. In managed mode, the mobile device may enforce a managed policy defined by a policy administrator, which may be for example an enterprise administrator or parent.

In drive mode, lockout features may include, by way of non-limiting example:

Silencing the ringer and other notifications of inbound calls and messages.

Automatically-responding to inbound phone calls and messages, including the ability for the user to optionally turn the auto-responder on or off, and to record or select the auto-response message.

Selecting and providing a limited whitelist of enabled applications that can be used in drive mode, such as navigation, music, and limited voice commands. These may be user-selectable or configured by enterprise or family policy.

Allowing emergency phone calls, such as calls to "911" or an equivalent service.

Allowing the user to manually override drive mode, such as by a voice command, or by a touch interaction. In some cases, the touch interaction may be selected to be deliberately difficult to perform while driving to discourage manual overrides for trivial reasons.

Allowing limited phone interaction only if a hands-free link is enabled.

Managed mode may provide the following, by way of non-limiting example:

Automatically enabling drive mode whenever the mobile device exceeds a threshold speed, such as 10 mph.

Providing notification to a policy administrator if settings are tampered with.

Providing a notification in any case where drive mode is manually overridden while in motion.

Protecting against uninstalls.

It should be appreciated that many other contexts and applications are possible for the methods described herein and it is intended that any such methods that are within the spirit and scope of the appended claims be included therein.

FIG. 1 is a perspective view of a user 120 operating a mobile device 110 while driving an automobile 130. A passenger 124 also rides in automobile 124. In this example, user 120 may be any suitable human actor. For example, user 120 may be an employee or agent of an enterprise, a teenager or new driver, unskilled driver, or simply a safety-conscious operator who, despite being a skilled driver, is aware of the inherent and unavoidable risks of simultaneously driving and operating a mobile device.

In another example, user 120 may not be a human actor, but may instead be a machine actor. For example, user 120 may be a mobile device that interfaces with a server or other computing device appropriately configured to provide the methods of the present Specification. In that context, mobile device 110 may be any suitable computing device, including a remote server that provides the functions described herein. In a more generic sense, user 120 may be any person, entity, or thing that operates mobile device 110, which may be any suitable computing device. In it is therefore intended that the teachings of this Specification be broadly construed to include any suitable combination of actors, human, machine, or otherwise, that are configured and operable to carry out the methods described herein.

For purposes of discussion, with reference to FIG. 1, user 120 will be described as a human user operating automobile 130, while passenger 124 rides and may also be capable of operating mobile device 110. In this example, mobile device 110 has a suitable data connection to automobile 130, for example a Bluetooth or other wireless connection, or a USB or other wired connection. For purposes of this discussion, a Bluetooth connection will be used as an example.

In this example, automobile 130 includes a display 140 that is highly visible to user 120. In one example, display 140 is on a dashboard of automobile 130, and includes a large-font, high-contrast text display that user 120 can observe and read readily without being distracted.

Also in this example, automobile 150 includes a proximity sensor 150 that is configured to detect a location of user 120 and/or mobile device 110. Proximity sensor 150 may be configured to provide back to mobile device 110 a signal or other data stream indicating whether user 120 is located in a driver's seat of automobile 130, or in the passenger seat of automobile 130. This may provide additional flexibility for a content locking engine 224 (FIG. 2) of mobile device 110. According to this method, when passenger 124 is operating mobile device 110, content locking engine 224 remains in an unlocked state. On the other hand, when user 120 is positioned so as to be the likely operator of automobile 130, content locking engine 224 may remain in its active state.

A discrete proximity sensor 150 is disclosed by way of example, but other types of active and passive sensors may be used. For example, many vehicles have existing pressure switches in the passenger side and driver side seats to activate or deactivate airbags according to activation criteria. Data from such a sensor could be used as proximity sensor 150. For example, if a pressure switch on the driver's side is activated, and no pressure switch is activated on the passenger side, then content locking engine 224 can usefully deduce that user 120 is operating the vehicle, and therefore content locking engine 224 should be in its active state.

In another example, mobile device 110 may be placed between user 120 and passenger 124, so that content locking engine 224 cannot usefully deduce which user is operating mobile device 110. In that case, as a safety, content locking engine 224 may default to its active state and lock mobile device 110 while automobile 130 is in motion. An override may be provided on a user interface to allow passenger 124 to unlock mobile device 110 if he or she so desires.

In another example, user 120 may also have a wearable device 160. Wearable device 160 can be communicatively coupled to mobile device 110 so that content locking engine 224, in conjunction with proximity sensor 150, can determine precisely where user 120 is sitting. This provides an additional layer of assurance concerning where user 120 is located. This may be particularly useful in a case where driver 120 and passenger 124 both operate similar mobile devices 110, and wherein it is desirable to determine which of the two is operating automobile 130.

It should be noted, however, that the various applications and embodiments of proximity sensor 150 may be optional. In some cases, a safety or security policy may be configured to ensure that mobile device 110 defaults to its active state regardless of whether proximity sensor 150 is present.

In another embodiment, the teachings of this Specification may be adapted to provide enhanced data security for mobile device 110. In that context, user 120 may have wearable device 160, and mobile device 110 may be equipped with content locking engine 224. In this example, a combination of motion along with separation from wearable device 160 may be used to deduce that mobile device 110 has either been lost or stolen. In that case, it may be desirable for content locking engine 224 to perform a security action, such as heavily encrypting mobile device 110, encrypting certain partitions of mobile device 110 so that enterprise data is secured, or in some cases performing a security wipe or other security action on mobile device 110.

In this example, automobile 130 includes display 140. Display 140 may provide useful context-sensitive data to user 120. For example, in FIG. 1, display 140 indicates that mobile device 110 is currently in a locked state. In this example, the reason mobile device 110 is in a locked state is because automobile 130 is currently in motion. Additionally, display 140 informs user 120 that a vehicle is currently moving at 55 miles per hour. This information may further advantageously be used to assist user 120 in ensuring that he is operating automobile 130 legally, for example, within a posted speed limit. Finally, display 140 may provide events of interest. For example, in this case, user 120 can see that he has an incoming call from a friend named Jim whose phone number is 101-555-1234.

In certain contexts, despite the fact that a call is incoming, it may be desirable to keep mobile device 110 in a locked state. Thus, in this case, the notification of an incoming call is not so that user 120 can answer the call, but simply so that user 120 is aware that Jim called, so that user 120 can call Jim back later if he wishes.

In other cases, content locking engine 224 may be configured to interoperate with a hands-free link of mobile device 110. In this case, user 120 may be locked out from performing actions that would take his eyes off of the road, or otherwise distract him from operating vehicle 130. But certain voice commands may be enabled, for example to allow user 120 to issue a command such as "answer call," which will then enable an in-vehicle hands-free link of automobile 130. Thus, in this example, user 120 is given the option to perform certain low risk activities while automobile 130 is in motion.

It should be noted, however, that certain credible studies have found that use may not statistically increase safety over the use of a mobile handset while operating a motor vehicle. Thus, in some embodiments, it may be more desirable to completely lock out phone calls.

Figure 2:
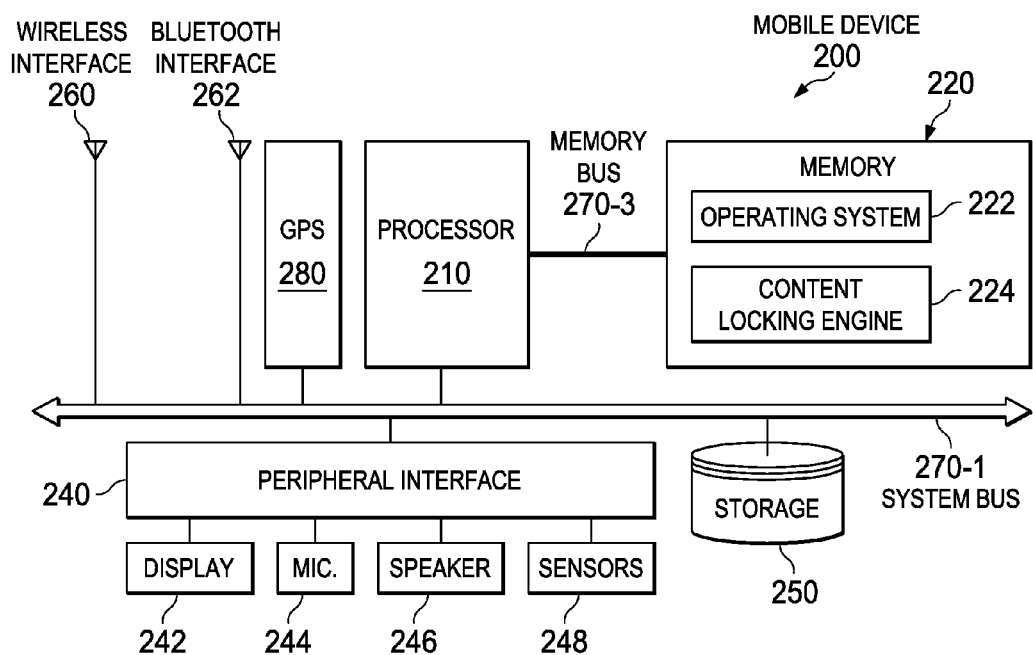
FIG. 2 is a block diagram of a computing device according to one or more examples of the present Specification.

FIG. 2 is a block diagram of mobile device 110 according to one or more examples of the present Specification. Mobile device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data.

Mobile device 110 includes a processor 210 connected to a memory 220, having stored therein executable instructions for providing an operating system 222 and content locking engine 224. Other components of mobile device 110 include a storage 250, network interface 260, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of content locking engine 224. Many other configurations are also possible, and are intended to be encompassed within the broad scope of this Specification.

Network interface 260 may be provided to communicatively couple mobile device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 7:
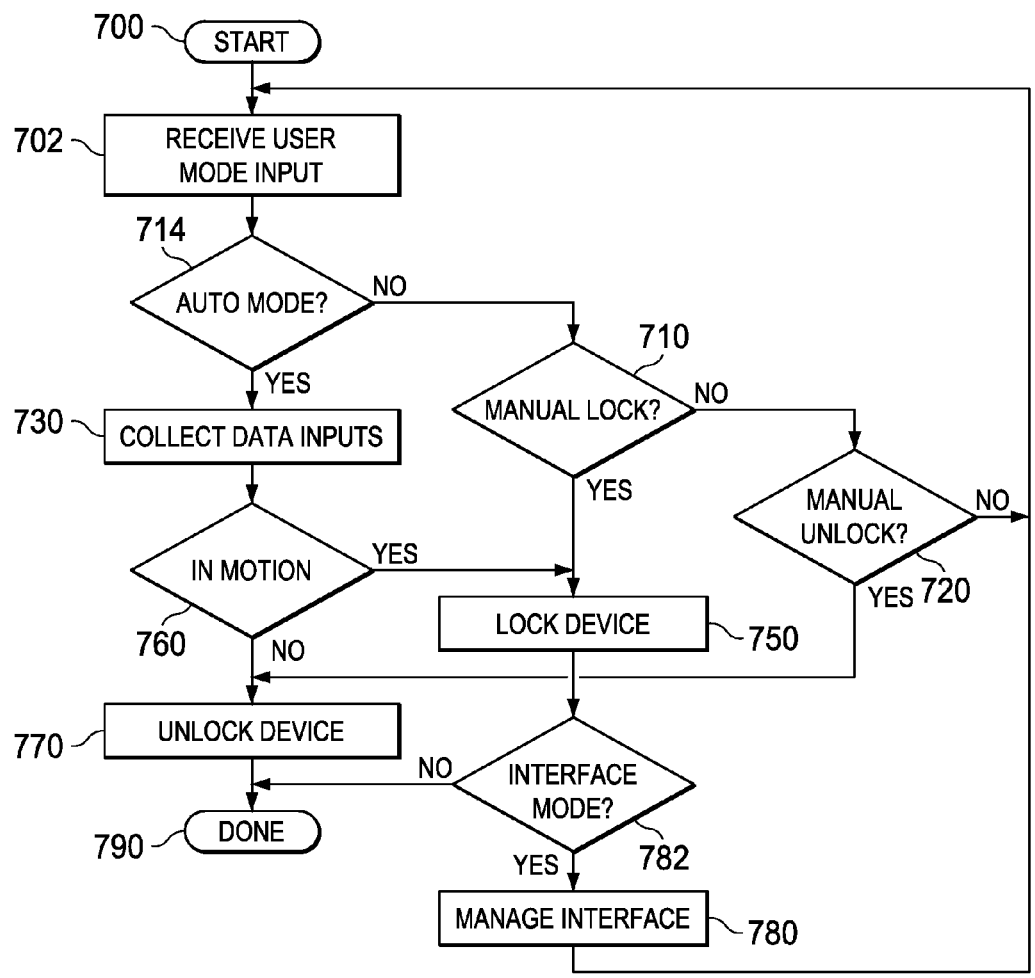
FIG. 7 is a flow chart of a method according to one or more examples of the present Specification.

Content locking engine 224, in one example, is a utility or program that carries out a method, such as method 700 of FIG. 7, or other methods according to this Specification. Content locking engine 224 may be, in various embodiments, embodied in hardware, software, firmware, or some combination thereof. For example, in some cases, content locking engine 224 may include a special integrated circuit designed to carry out a method or a part thereof, and may also include software instructions operable to instruct a processor to perform the method. In some cases, content locking engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that content locking engine 224 is provided by way of non-limiting example only, and that other hardware and software, including interactive or user-mode software, may also be provided in conjunction with, in addition to, or instead of content locking engine 224 to perform methods according to this Specification.

In one example, content locking engine 224 includes executable instructions stored on a non-transitory medium operable to perform method 700 of FIG. 7, or a similar method according to this Specification. At an appropriate time, such as upon booting mobile device 110 or upon a command from operating system 222 or a user 120, processor 210 may retrieve a copy of content locking engine 224 (or software portions thereof) from storage 250 and load it into memory 220. Processor 210 may then iteratively execute the instructions of content locking engine 224.

Peripheral interface 240 may be configured to interface with any auxiliary device that connects to mobile device 110 but that is not necessarily a part of the core architecture of mobile device 110. A peripheral may be operable to provide extended functionality to mobile device 110, and may or may not be wholly dependent on mobile device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Peripheral interface 240 may connect to one or more peripherals, including display 242, microphone 244, speaker 246, and sensors 248. Sensors 248 may include any of the sensors disclosed herein. In one example, sensors 248 include a proximity sensor 150 or an interface to proximity sensor 150. In other examples, any appropriate sensor for determining whether user 120 is operating mobile device 110 may be used as or in conjunction with proximity sensor 150.

Sensors 248 may also include a speed or velocity sensor. The speed or velocity sensor may include a GPS, which will indicate both speed and direction. In another example, an accelerometer and integrator, or other speed detector, may be used to detect speed. An interface may also be provided in some cases to automobile 130's built-in speedometer. In yet another example, GPS is used for speed detection, and an accelerometer with integrator is used to refine and/or update the GPS signal. A compass may also provide direction to supplement any of the foregoing, or any other appropriate speed sensor may be used.

It should be noted that in certain contexts, mobile device 110 need not be in actuality mobile. In this context, it should be understood that the term "mobile device" is used by way of example only to provide a useful basis for discussion. However, as discussed above, other architectures are possible. For example, user 120 may operate a wearable device 160, which may communicatively couple to an embedded computer with an automobile 130. In that case, wearable device 160 may not have the storage or computing capacity to provide all the necessary logic and interfaces for carrying out methods according to this Specification. In that case, content locking engine 224 may be provided on a remote server. It will be appreciated that many other configurations and architectures are possible, and it is intended that such are included within the scope of the present Specification.

FIG. 3 is a front view of an example user interface that may be provided according to one or more examples of the present Specification. User interface 300 may be configured to display on a mobile phone, such as a phone operating Android, iOS, Windows mobile, or other suitable mobile operating system. In certain examples, user interface 300 may be configured to operate with a GPS subsystem within mobile device 110. In that case, display 140 of automobile 130 may not be configured as a simple large-font high-contrast text display. Rather, display 140 may provide a full, high-resolution graphical user interface, which may display GPS map data, or other useful data. In some cases, mobile device 110 may provide a virtual terminal interface, so that display 140 of vehicle 130 can mirror display 242 of mobile device 110.

In one or more embodiments of the present Specification, user interface 300 may provide an initial configuration screen that user 120 may use to configure options before operating automobile 130. In that case, certain controls may be provided, such as a settings menu 310, and a start button 320. Settings menu 310 may provide access to a configuration screen, such as the screen of FIG. 4.

Start button 320 may manually lock mobile device 110 into drive mode, or may place mobile device 110 into an automatic mode.

FIG. 4 is a front view of a user interface 400 provided in one or more examples of the present Specification. User interface 400 provides an example settings menu. In this example, a first control 410 provides a parental or administrator mode, in which content locking engine 224 may be locked into its active or automatic state unless a password or other security token is provided.

Selection menu 420 may be used in one embodiment only in administrator mode, to select certain limited applications that may be enabled while automobile 130 is moving. For example, a GPS or map application may be enabled, and a music player may be enabled. In some contexts, this action may also be used to indicate whether a hands-free link should be enabled during motion, or whether any other suitable application should similarly be enabled. Selection menu 430 provides an option for an automatic reply, such as to text messages, or an automated voicemail message that indicates that user 120 is presently operating automobile 130 and therefore cannot currently respond to text messages or phone calls.

Selection menu 430 may provide, by way of nonlimiting example, a selection box where one of several preconfigured messages may be selected, where a voicemail message may be recorded, or a free-form text input string on which user 120 can provide his own customized message.

In selection menu 440, a parent or administrator may select a message that is automatically provided when user 120 is operating vehicle 130. The parent or administrator may also receive a log of events, such as if user 120 or passenger 124 manually disables drive mode while in motion.

FIG. 5 is an example user interface 500 that may be displayed while content locking engine 224 is in drive mode. In this case, the display may be highly simplified, and may provide only a few limited functions. For example, in this case a large text display provides the user's current speed. Because the user is not currently in motion, mobile device 110 is unlocked. Other options include a stop button 510, which enables user 120 to exit the mobile application, a phone button 530 that enables user 120 to make phone call, a music button 540 that enables user 120 to launch a music application, and a map button 550 that enables user 120 to enter, for example, GPS navigation mode.

FIG. 6 is a front view of a graphical user interface 500-2, in which automobile 130 is driving at 55 mph. In this case, stop button 510 may be disabled or hidden. Touch icons 530, 540, and 550 may also be disabled in certain embodiments, or may be available only if an administrator has enabled them such as by menu 420 of FIG. 4. In one example, all touch-based interactions on display 242 are completely disabled, and mobile device 110 may receive only voice commands. It should be noted that this mode is provided by way of nonlimiting example only, and that other configurations are possible according to certain design parameters that a system designer may need to determine at design time.

FIG. 7 is a flow chart of a method 700 performed, for example, by a content locking engine 224 of FIG. 2 according to one or more examples of the present Specification.

In block 702, content locking engine 224 receives from user 120 a mode input.

In decision block 714, content locking engine 224 determines whether the mode input is to place mobile device 110 into automatic mode. In block 730, if mobile device 110 is in automatic mode, then content locking engine 224 collects data inputs from the data sources disclosed herein.

In decision block 760, content locking engine 224 determines whether automobile 130 is in motion, in this case motion being defined as exceeding a speed threshold. In block 770, if automobile 130 is not in motion, then in block 770, mobile device 110 in an unlocked state. It should be noted that as used throughout this Specification, the terms "lock" and "unlock" should be construed to include either actively changing the device to the state, or if the device is already in that state, leaving it in that state.

Returning to block 760 if automobile 130 is in motion, then in block 750, content locking engine 224 locks mobile device 110.

In decision block 782, content locking engine 224 determines whether it is in an interface mode. This determines, for example, whether any user interface is provided.

If content locking engine 224 is not in interface mode, then in block 790 the method is done.

In block 782, if content locking engine 224 is an interface mode, then in block 780, content locking engine 224 manages user interface 242 according to its current configuration, and control returns to block 702.

Returning to block 714, if content locking engine 224 is not in automatic mode, then in decision block 710, content locking engine 224 determines whether the user's mode input at block 702 was a manual lock.

If a manual lock was provided, then in block 750, content locking engine 224 locks mobile device 110, and the flow continues as described above in connection with block 710.

Returning to block 710, if a manual lock was not provided, then in decision block 720, content locking engine 224 determines whether a manual unlock command was provided. It should be noted that a manual unlock command may take one of various forms. In some cases, it may be a simple button or selection. In other cases, it may include a hardcoded or user selectable action that is too complicated for user 120 to safely provide while driving. This special mode may be enabled only when vehicle 130 is in motion. This helps to ensure that user 120 does not provide a manual unlock while driving an automobile 130. However, it will enable another user, such as passenger 124 to unlock mobile device 110 to use.

If user 120 or passenger 124 provide a manual unlock, then in block 770, mobile device 110 is unlocked, and flow proceeds according to the description of block 770 provided above.

Returning to block 720, if a manual unlock is not provided, then control may return to starting block 700, and await additional user input.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In an embodiment of the foregoing method wherein mobile device 110 is running an Android operating system, a Java reflection mechanism may be used to interface with the "hidden" telephony interface, which enables content locking engine 224 to hook into phone calls. This can be used to prevent mobile device 110 from ringing while in a locked mode.

Example code to add a view to the system window manager includes:

```
WindowManager wm = (WindowManager)getApplicationContext( )
    .getSystemService(Context.WINDOW_SERVICE);
    try{
        Tracer.d(TAG,"unhiding lock screen");
        wm.addView(mTopView, mLockParams);
    }catch(Exceptione) {
        Tracer.d(TAG,"Exception unhiding view....");
        e.printStackTrace( );
    }
```

Example code to get a telephone manager interface includes:

```
finalMethod m =
mTelephonyManager.getClass( ).getDeclaredMethod("getITelephony");
    m.setAccessible(true);
    returnITelephony.class.cast(m.invoke(mTelephonyManager));
```

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

IMPLEMENTATION EXAMPLES

There is disclosed in an example 1, a mobile device comprising: a speed detector; and one or more logic elements comprising a content locking engine, operable for: detecting that the mobile device is in motion above a threshold speed; and causing the mobile device to enter a locked state, wherein the locked state comprises disabling at least a portion of a user interface.

There is disclosed in an example 2, the mobile device of example 1, wherein the speed detector comprises a global positioning system (GPS) receiver.

There is disclosed in an example 3, the mobile device of example 1, wherein the speed detector comprises an accelerometer and an integrator.

There is disclosed in an example 4, the mobile device of example 1, wherein the content locking engine is further operable for provided access to at least one application while the mobile device is in the locked state.

There is disclosed in an example 5, the mobile device of example 4, wherein at least one application comprises an application selected from the list consisting of a music player, a navigation system, and a hands-free link.

There is disclosed in an example 6, the mobile device of example 1, wherein the content locking engine is further operable for providing an automatic response to an incoming communication.

There is disclosed in an example 7, the mobile device of example 1, wherein the content locking engine is further operable for providing at least limited functionality via a hands-free interface while in the locked state.

There is disclosed in an example 8, the mobile device of example 1, wherein the content locking engine is further operable for causing the mobile device to exit the locked state upon receiving a user command.

There is disclosed in an example 9, the mobile device of example 8, wherein the user command is selected to be difficult to perform while operating a motor vehicle.

There is disclosed in an example 10, the mobile device of example 1, further comprising a user location detector, and wherein the content locking engine is operable for causing the mobile device to enter the locked state only if the user location detector determines that a user of the mobile device is operating a motor vehicle.

There is disclosed in an example 11, the mobile device of example 10, wherein the user location detector comprises a proximity switch sensitive to a user located in a driver's seat of a motor vehicle.

There is disclosed in an example 12, the mobile device of example 10, wherein the user location detector comprises a wearable computing device.

There is disclosed in an example 13, the mobile device of example 1, wherein the content locking engine further comprises an administrative interface having an authentication mechanism.

There is disclosed in an example 14, one or more tangible computer-readable mediums having stored thereon executable instructions operable for providing a content locking engine operable for: detecting that a mobile device is in motion above a threshold speed; and causing the mobile device to enter a locked state, wherein the locked state comprises disabling at least a portion of a user interface.

There is disclosed in an example 15, the one or more tangible computer-readable mediums of example 14, wherein detecting that the mobile device is in motion comprises receiving global positioning system (GPS) data.

There is disclosed in an example 16, the one or more tangible computer-readable mediums of example 14, wherein detecting that the mobile device is in motion comprises receiving accelerometer data.

There is disclosed in an example 17, the one or more tangible computer-readable mediums of example 14, wherein the content locking engine is further operable for provided access to at least one application while the mobile device is in the locked state.

There is disclosed in an example 18, the one or more tangible computer-readable mediums of example 14, wherein the content locking engine is further operable for providing an automatic response to an incoming communication.

There is disclosed in an example 19, the one or more tangible computer-readable mediums of example 14, wherein the content locking engine is further operable to provide at least limited functionality via a hands-free interface while the mobile computing device is in the locked state.

There is disclosed in an example 20, the one or more tangible computer-readable mediums of example 14, wherein the content locking engine is further operable to cause the mobile computing device to exit the locked state upon receiving a user command.

There is disclosed in an example 21, the one or more tangible computer-readable mediums of example 20, wherein the user command is selected to be difficult to perform while operating a motor vehicle.

There is disclosed in an example 22, the one or more tangible computer-readable mediums of example 14, wherein the content locking engine is further operable to cause the mobile device to enter the locked state only if it is determined that a user of the mobile device is operating a motor vehicle.

There is disclosed in an example 23, the one or more tangible computer-readable mediums of example 22, wherein determining that the user is operating the motor vehicle comprises communicating with a wearable computing device.

There is disclosed in an example 24, a method for locking a mobile device while in motion comprising: detecting that the mobile device is in motion above a threshold speed; and causing the mobile device to enter a locked state, wherein the locked state comprises disabling at least a portion of a user interface.

There is disclosed in an example 25, the method of example 24, further comprising determining that a user of the mobile device is operating a motor vehicle.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

The invention claimed is:
1. A mobile device comprising:
a speed detector;
a user location detector to determine that a user of the mobile device is in a driver's position within a vehicle; and
one or more logic elements comprising a content locking engine, operable for:
detecting that the mobile device is in motion above a first threshold speed; and
causing the mobile device to enter a locked state, wherein the locked state comprises disabling at least a portion of a user interface;
wherein the content locking engine is operable for causing the mobile device to enter the locked state only if the user location detector determines that the user is in the driver's position; and
to exit the locked state only upon determining that the mobile device motion has fallen below a second threshold speed or that the user has successfully completed a touch-based unlock command, wherein the touch-based unlock command requires using both hands and is too difficult for an operator of the vehicle to perform safely while driving, but that is practical for a user who is not operating the vehicle to perform.

2. The mobile device of claim 1, wherein the speed detector comprises a global positioning system (GPS) receiver.

3. The mobile device of claim 1, wherein the speed detector comprises an accelerometer and an integrator.

4. The mobile device of claim 1, wherein the content locking engine is further operable for providing access to at least one application while the mobile device is in the locked state.

5. The mobile device of claim 4, wherein the at least one application comprises an application selected from the list consisting of a music player, a navigation system, and a hands-free link.

6. The mobile device of claim 1, wherein the content locking engine is further operable for providing an automatic response to an incoming communication.

7. The mobile device of claim 1, wherein the content locking engine is further operable for providing at least limited functionality via a hands-free interface while in the locked state.

8. The mobile device of claim 1, wherein the user location detector comprises a proximity switch sensitive to a user located in a driver's seat of a motor vehicle.

9. The mobile device of claim 1, wherein the user location detector comprises a wearable computing device.

10. The mobile device of claim 1, wherein the content locking engine further comprises an administrative interface having an authentication mechanism.

11. The mobile device of claim 1, wherein the second threshold speed is different from the first threshold speed.

12. The mobile device of claim 1, wherein the second threshold speed is the same as the first threshold speed.

13. One or more tangible, non-transitory computer-readable mediums having stored thereon executable instructions operable for providing a content locking engine operable for:
- detecting that a mobile device is in motion above a first threshold speed;
- detecting that a user of the mobile device occupies a driver's position within a vehicle; and
- causing the mobile device to enter a locked state, wherein the locked state comprises disabling at least a portion of a user interface; and
- to exit the locked state only upon determining that the mobile device motion has fallen below a second threshold speed or that the user has successfully completed a touch-based unlock command, wherein the touch-based unlock command requires using both hands and is too difficult for an operator of the vehicle to perform safely while driving, but that is practical for a user who is not operating the vehicle to perform.

14. The one or more tangible, non-transitory computer-readable mediums of claim 13, wherein detecting that the mobile device is in motion comprises receiving global positioning system (GPS) data.

15. The one or more tangible, non-transitory computer-readable mediums of claim 13, wherein detecting that the mobile device is in motion comprises receiving accelerometer data.

16. The one or more tangible, non-transitory computer-readable mediums of claim 13, wherein the content locking engine is further operable for providing access to at least one application while the mobile device is in the locked state.

17. The one or more tangible, non-transitory computer-readable mediums of claim 13, wherein the content locking engine is further operable for providing an automatic response to an incoming communication.

18. The one or more tangible, non-transitory computer-readable mediums of claim 13, wherein the content locking engine is further operable to provide at least limited functionality via a hands-free interface while the mobile device is in the locked state.

19. The one or more tangible, non-transitory computer-readable mediums of claim 13, wherein the content locking engine is further operable for determining that the user is operating the motor vehicle, further comprising communicating with a wearable device.

20. The one or more tangible, non-transitory computer-readable mediums of claim 13, wherein the second threshold speed is different from the first threshold speed.

21. The one or more tangible, non-transitory computer-readable mediums of claim 13, wherein the second threshold speed is the same as the first threshold speed.

22. A method for locking a mobile device while in motion comprising:
- detecting that the mobile device is in motion above a first threshold speed;
- determining that a user of the mobile device occupies a driver's position of a vehicle; and
- causing the mobile device to enter a locked state, wherein the locked state comprises disabling at least a portion of a user interface; and to exit the locked state only upon determining that the mobile device motion has fallen below a second threshold speed or that the user has successfully completed a touch-based unlock command, wherein the touch-based unlock command requires using both hands and is too difficult for an operator of the vehicle to perform safely while driving, but that is practical for a user who is not operating the vehicle to perform.

23. The method of claim 22, wherein detecting that the mobile device is in motion comprises receiving global positioning system (GPS) data.

24. The method of claim 22, wherein detecting that the mobile device is in motion comprises receiving accelerometer data.

25. The method of claim 22, further comprising providing access to at least one application while the mobile device is in the locked state.

* * * * *